United States Patent
Bretschneider et al.

(10) Patent No.: US 7,870,426 B2
(45) Date of Patent: Jan. 11, 2011

(54) APPARATUS, SYSTEM, AND METHOD FOR TRANSACTIONAL PEER RECOVERY IN A DATA SHARING CLUSTERING COMPUTER SYSTEM

(75) Inventors: Ronald Edward Bretschneider, San Jose, CA (US); Marc Kenneth Duquette, Santa Cruz, CA (US); Michelle Parks Dais, legal representative, Santa Cruz, CA (US); William Stuart Edwards, Napa, CA (US); Ruth Leslie Ferziger, San Jose, CA (US); Peter Verl Gibson, San Jose, CA (US); Lyle LeRoy Merithew, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 11/858,739

(22) Filed: Sep. 20, 2007
(Under 37 CFR 1.47)

(65) Prior Publication Data
US 2008/0215909 A1 Sep. 4, 2008

Related U.S. Application Data

(63) Continuation-in-part of application No. 10/824,147, filed on Apr. 12, 2004, now Pat. No. 7,281,153.

(51) Int. Cl.
*G06F 11/00* (2006.01)
(52) U.S. Cl. .................. 714/16; 714/3; 714/44; 714/48; 709/224; 709/226; 710/307; 718/102; 718/104

(58) Field of Classification Search .............. 714/3, 714/16, 44, 48; 710/307; 709/224, 226; 718/102, 104
See application file for complete search history.

(56) References Cited

U.S. PATENT DOCUMENTS

| 5,155,678 A | 10/1992 | Fukumoto et al. ............ 395/425 |
| 5,261,089 A | 11/1993 | Coleman et al. ............. 395/600 |
| 5,291,490 A | 3/1994 | Conti et al. ................ 370/392 |
| 5,319,774 A | 6/1994 | Ainsworth et al. ............ 714/20 |
| 5,418,940 A | 5/1995 | Mohan ..................... 395/575 |

(Continued)

OTHER PUBLICATIONS

Ha Beier et. al., "IMS/VS Data Sharing Enhancements (Dynamic Reconfiguration to Initial State)" IBM TDB, p. 338-342, Jun. 1984.

(Continued)

*Primary Examiner*—Robert Beausoliel
*Assistant Examiner*—Jeison C Arcos
(74) *Attorney, Agent, or Firm*—Kunzler Needham Massey & Thorpe

(57) ABSTRACT

The invention provides an apparatus, system, and method for cluster-wide peer recovery in the event of a computer failure. A failure of a first computer is detected and a recovery module is registered as the first computer. In one embodiment, the recovery module is a peer computer. The recovery module retrieves a privately held undo log data through the authorized assumption of the failure identity associated with the failed first computer, backs out in-flight transaction updates of the first computer, and frees up data resources locked by the first computer.

15 Claims, 10 Drawing Sheets

U.S. PATENT DOCUMENTS

| | | | |
|---|---|---|---|
| 5,432,926 A | 7/1995 | Citron et al. | 714/4 |
| 5,465,328 A | 11/1995 | Dievendorff et al. | 714/15 |
| 5,634,072 A | 5/1997 | Allen et al. | 395/674 |
| 5,699,500 A | 12/1997 | Dasgupta | 395/180 |
| 5,699,501 A | 12/1997 | Badovinatz et al. | 714/4 |
| 5,815,651 A | 9/1998 | Litt | 714/10 |
| 6,018,810 A * | 1/2000 | Olarig | 714/43 |
| 6,389,420 B1 | 5/2002 | Vahalia et al. | 707/8 |
| 6,493,826 B1 | 12/2002 | Schofield et al. | 713/200 |
| 6,526,416 B1 | 2/2003 | Long | 707/202 |
| 6,647,510 B1 | 11/2003 | Ganesh et al. | 714/16 |
| 6,769,074 B2 | 7/2004 | Vaitzblit | 714/16 |
| 6,895,472 B2 | 5/2005 | Neiman et al. | 711/118 |
| 6,898,740 B2 | 5/2005 | Olarig | 714/43 |
| 6,934,880 B2 | 8/2005 | Hofner | 714/10 |
| 7,065,674 B2 | 6/2006 | Cabrera et al. | 714/16 |
| 7,146,532 B2 | 12/2006 | McCabe | |
| 7,730,489 B1 * | 6/2010 | Duvur et al. | 718/104 |
| 2002/0049845 A1 | 4/2002 | Sreenivasan et al. | 709/226 |
| 2002/0065795 A1 | 5/2002 | Asherman | 707/1 |
| 2002/0078207 A1 | 6/2002 | Iwamoto | 709/226 |
| 2002/0103663 A1 * | 8/2002 | Bankier et al. | 705/1 |
| 2003/0046258 A1 | 3/2003 | Candee et al. | 707/1 |
| 2003/0079154 A1 | 4/2003 | Park et al. | 714/1 |
| 2003/0110330 A1 | 6/2003 | Fujie et al. | 710/36 |
| 2003/0163755 A1 | 8/2003 | Fung et al. | 714/4 |
| 2003/0187859 A1 | 10/2003 | Belov | 707/100 |
| 2004/0025093 A1 | 2/2004 | Willy et al. | 714/54 |
| 2005/0060406 A1 | 3/2005 | Zhang et al. | 709/225 |
| 2005/0114609 A1 | 5/2005 | Shorb | 711/152 |
| 2005/0125557 A1 * | 6/2005 | Vasudevan et al. | 709/239 |
| 2005/0160312 A1 | 7/2005 | Seng et al. | 714/13 |
| 2005/0229021 A1 | 10/2005 | Lubbers et al. | |

OTHER PUBLICATIONS

RS Keller et. al., "Self-Destruction Locks" IBM TDB, v36 n9B, p. 413-414, Sep. 1993.

* cited by examiner

APPARATUS, SYSTEM, AND METHOD FOR TRANSACTIONAL PEER RECOVERY IN A DATA SHARING CLUSTERING COMPUTER SYSTEM

CROSS-REFERENCES TO RELATED APPLICATIONS

This application is a continuation-in-part of and claims priority to U.S. patent application Ser. No. 10/824,147 entitled "APPARATUS, SYSTEM, AND METHOD FOR TRANSACTION PEER RECOVERY IN A DATA SHARING CLUSTERING COMPUTER SYSTEM" and filed on Apr. 12, 2004 for Ronald E. Bertschneider et al., which is incorporated herein by reference.

BACKGROUND OF THE INVENTION

1. Field of the Invention

This invention relates to failure recovery in a computer system and more particularly relates to computer failure recovery in a transactional processing system.

2. Description of the Related Art

Computer systems including transactional processing consisting of a cluster of computers logically connected to each other through a shared memory controller and sharing disks and data often support high transaction rates and high availability for on-line transaction processing (OLTP) and other applications. Clustering systems of multiple computers may execute both on-line transactions and non-interactive work. Non-interactive work, such as batch jobs including updates, can concurrently share data with on-line transaction processing. Multiple batch jobs and on-line transactions can be run against the same files. The computer system ensures data reliability and availability for batch updates while the OLTP server ensures them for on-line updates. A computer or OLTP server may lock a resource such as a portion of a disk while accessing the disk.

A computer generally provides a recovery function that automatically restores updated resources to the before-update states and releases resources locks. This recovery function is generally initiated following the termination of a batch job conducting transactional processing. The recovery function uses a system undo log recorded before resources were changed to back out transactions active at the time of failure. Unfortunately, recovery after a computer failure can take a long time, and the process is not automatic. In-flight transaction updates can thus remain for a long time, making locked resources unavailable to on-line transaction processing and other non-interactive jobs on active peer computers in the cluster. In such cases, even a peer computer running on an active system cannot back out the in-flight transaction updates of the failed computer, because the peer computer cannot normally access the private undo log maintained by the failed computer. Furthermore, the failed computer may try to restart by itself, compounding the recovery problem.

What is needed is a method, apparatus, and system that allows a computer failure recovery to be performed expeditiously by one and only one peer, enables the peer computer to access log records privately held by the failed computer for a transaction backout, and prevents the failed computer from restarting until after the peer recovery. Beneficially, such a method, apparatus, and system would accelerate computer failure recovery.

SUMMARY OF THE INVENTION

The present invention has been developed in response to the present state of the art, and in particular, in response to the problems and needs in the art that have not yet been fully solved by currently available non-interactive transaction services programs supporting concurrent data sharing. Accordingly, the present invention has been developed to provide a peer recovery using an assumed-failure identity method, apparatus, and system for releasing locked data sharing resources that overcome many or all of the above-discussed shortcomings in the art.

In one aspect of the present invention, the apparatus for peer recovery is provided with a logic unit containing a plurality of modules configured to functionally execute the necessary steps of the peer recovery. These modules in the described embodiments include a detection module, a recovery coordination module, and a recovery module. The detection module detects the failure of a first computer. The recovery coordination module accepts and rejects requests from the recovery module for registering as the counterpart of the first computer, and unregisters the recovery module as the counterpart of the first computer.

The recovery module registers with the recovery coordination module as the counterpart of the first computer, performs a recovery operation of the first computer, and unregisters with the recovery coordination module as the counterpart of the first computer. The apparatus, in one embodiment, is configured to initiate peer recovery automatically. In an alternate embodiment, the apparatus is configured to initiate peer recovery responsive to an operator command. In a further embodiment of the apparatus, the recovery module includes an initialization module configured to initialize and start the counterpart of the first computer and a backout module configured to retrieve private log data of the first computer, back out in-flight transaction updates, and release data resources locked by the first computer.

In a certain embodiment, the detection module, the recovery coordination module, and the recovery module reside within a second computer. The apparatus is further configured, in one embodiment, to block recovery modules of a third computer and the first computer from registering as the counterpart of the first computer.

In another aspect of the present invention, a system for cluster-wide peer recovery is presented. In particular, the system includes a first computer, a second computer, a shared memory controller, and a disk. The second computer is in communication with the first computer and detects a failure of the first computer, wherein the second computer registers as the counterpart of the failed first computer, recovers the operation of the first computer, and unregisters as the counterpart of the first computer. The shared memory controller is in communication with the first computer and the second computer, stores and retrieves cluster component status and log data, prevents unauthorized access to private log data, and locks data resources. The disk stores and retrieves user data and system data in disk's storage media. In one embodiment, the counterpart of the first computer retrieves the private log data of the first computer, backs out in-flight transaction updates of the first computer and release data resources locked by the first computer.

A method of the present invention is also presented for peer recovery. The method in the disclosed embodiments substantially includes the steps necessary to carry out the functions presented above with respect to the operation of the described apparatus and system. The method includes detecting a failure of a first computer, registering a counterpart of the first computer, recovering the operation of the first computer by the counterpart, and unregistering the counterpart of the first computer. In one embodiment, recovering the operation of the first computer includes initializing and starting the counterpart of the first computer, retrieving private log data of the first computer, backing out in-flight transaction updates of the first computer, and releasing data resources locked by the first computer.

The present invention expeditiously retrieves privately held undo log data through an authorized assumption of the failure identity associated with the failed first computer, backs out in-flight transaction updates of the first computer, and releases data resources locked by the first computer. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
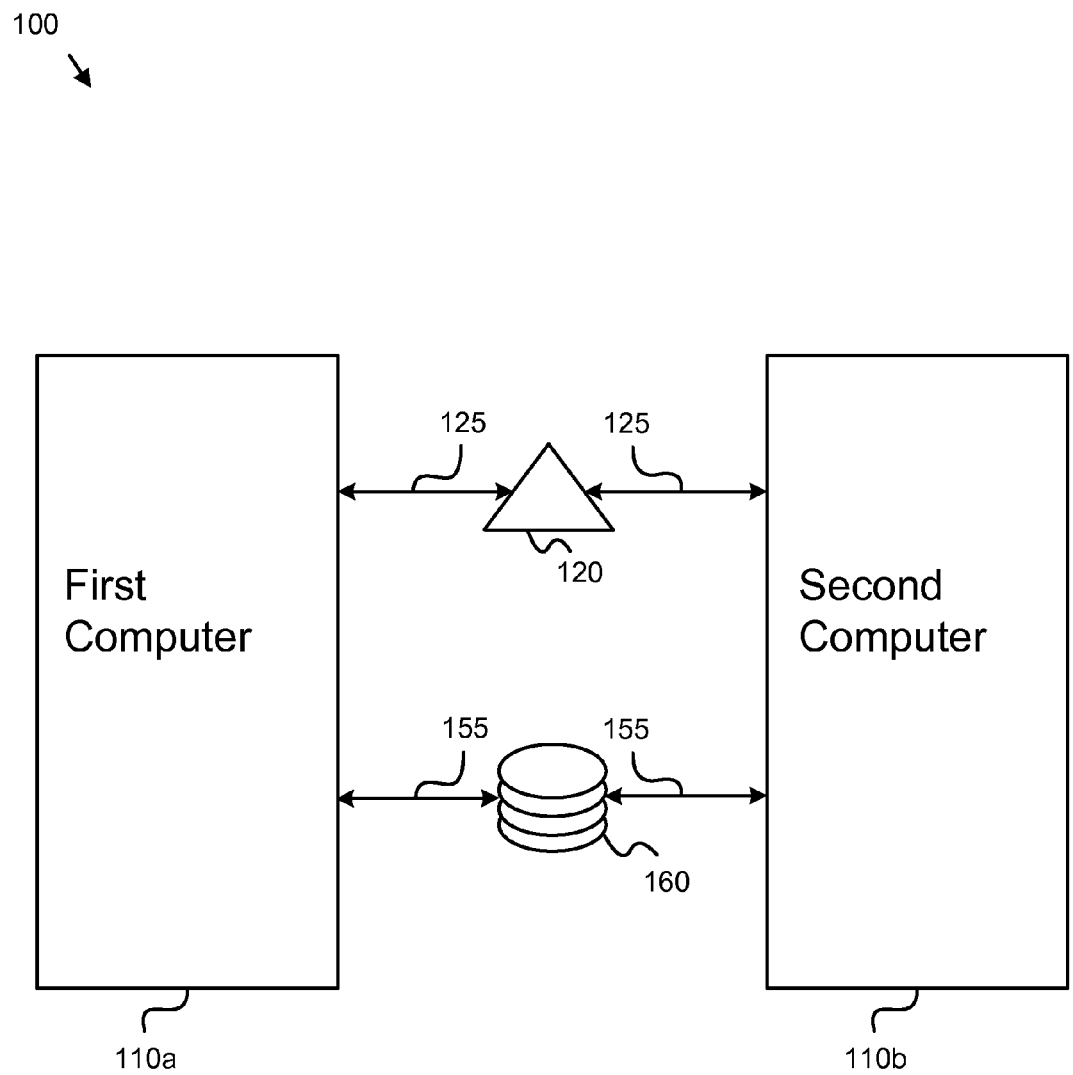
FIG. 1 is a schematic block diagram illustrating one embodiment of a peer recovery system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a peer recovery system 100 in accordance with the present invention. The system 100 is also referred to as a clustering system or cluster. Work requests that are associated with workload such as business transactions may be executed on any computer in the system 100 based on available processor capacity. As depicted, the system 100 includes a first computer 110a, a second computer 110b, a shared memory controller 120, two coupling links 125, a disk 160, and two input/output links 155. Each computer 110 may contain multiple processors and memory and may communicate with other computers 110 through the shared memory controller 120 connected via coupling links 125 and shares a disk 160 with other computers 110 through input/output links 155.

The shared memory controller 120 is in communication with all computers 110 and is configured to store and retrieve cluster component status and log data. The shared memory controller 120 is further configured to prevent unauthorized access to private log data and to lock resources. The disk 160 is configured to store and retrieve user data and system data in the disk's 160 storage media. Although for purposes of clarity, as shown, the cluster of computers 100 includes two computers 110, one shared memory controller 120, two coupling links 125, one disk, and two input/output links, any number of computers 110, shared memory controllers 120, coupling links 125, disks 160, and input/output links 155 may be employed.

In a certain embodiment, the computers 110 may use a symmetric multiprocessor configuration. In a further embodiment, the system 100 may use an asymmetric multiprocessor configuration. The shared memory controller 120 may include a processor and memory. The processor of the shared memory controller 120 is in one embodiment a dedicated processor. The memory of the shared memory controller 120 is preferably non-volatile memory. The signaling paths used for inter-computer communication may be point- to-point, using a channel-to-channel communication connection mechanism, including an inbound path and an outbound path. The system 100 may further include a timer (not shown) that synchronizes all the computers 110 to the time-of-day clocks. In a further embodiment, the system includes an operator console (not shown) to allow each computer 110 to communicate with the system operator.

Figure 2:
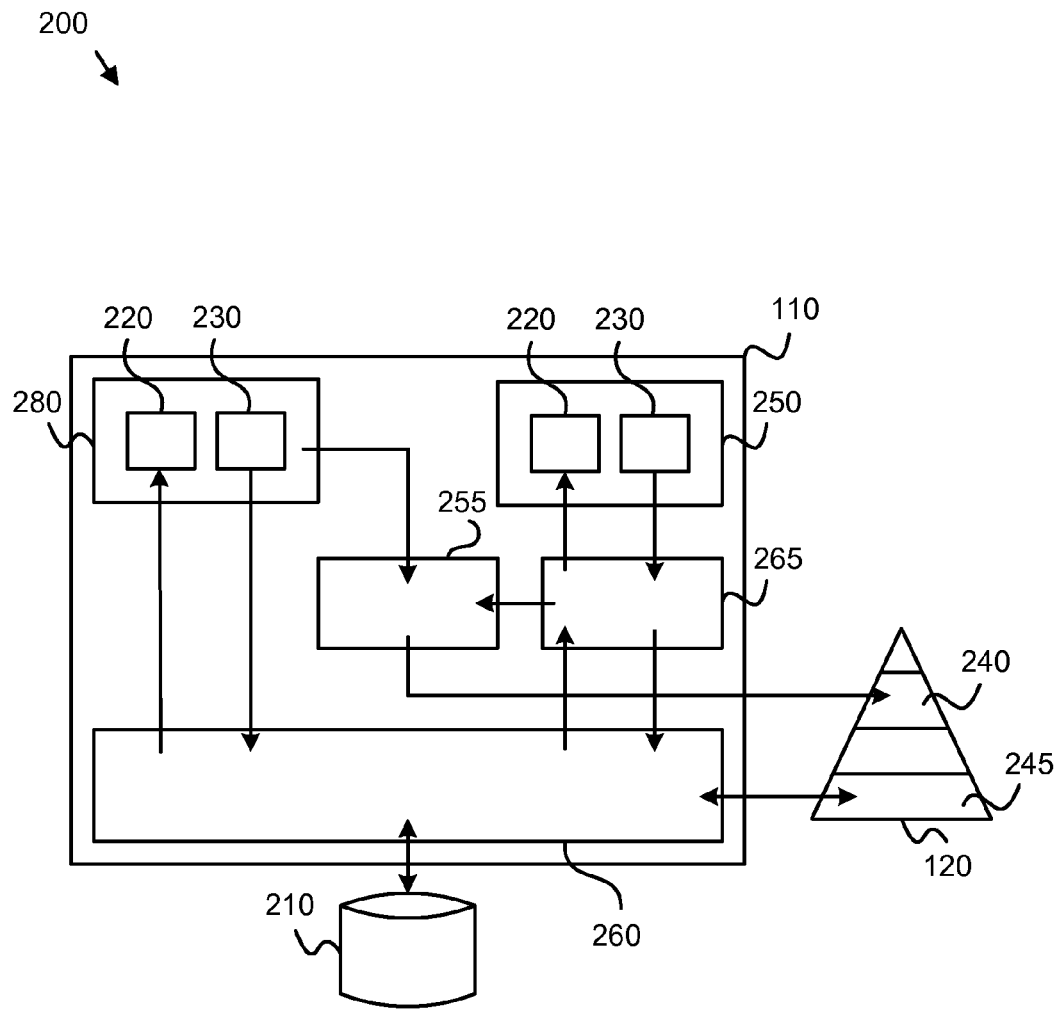
FIG. 2 is a schematic block diagram illustrating one embodiment of a batch operating environment in concurrency with OLTP in accordance with the present invention.

FIG. 2 is a schematic block diagram illustrating one embodiment of a batch operating environment 200 in concurrency with on-line transaction processing (OLTP) in accordance with the present invention. As depicted, on a computer 110, when an application issues a read request 220 or a write request 230, a storage access method server (SAMS) 260 acquires locks on behalf of the application for either a batch job through the batch job handler 250 or OLTP through an OLTP server 280. The shared memory controller 120 is used to hold locks in the shared memory controller's 120 lock structure 245, so that the locks can be shared by all the SAMS 260 address spaces in the cluster. In the event of a first computer 110a failing before transaction updates are committed, a second computer 110b may take over the unfinished transaction of the first computer 110a, releasing any resources locked by the first computer 110a.

Figure 3A:
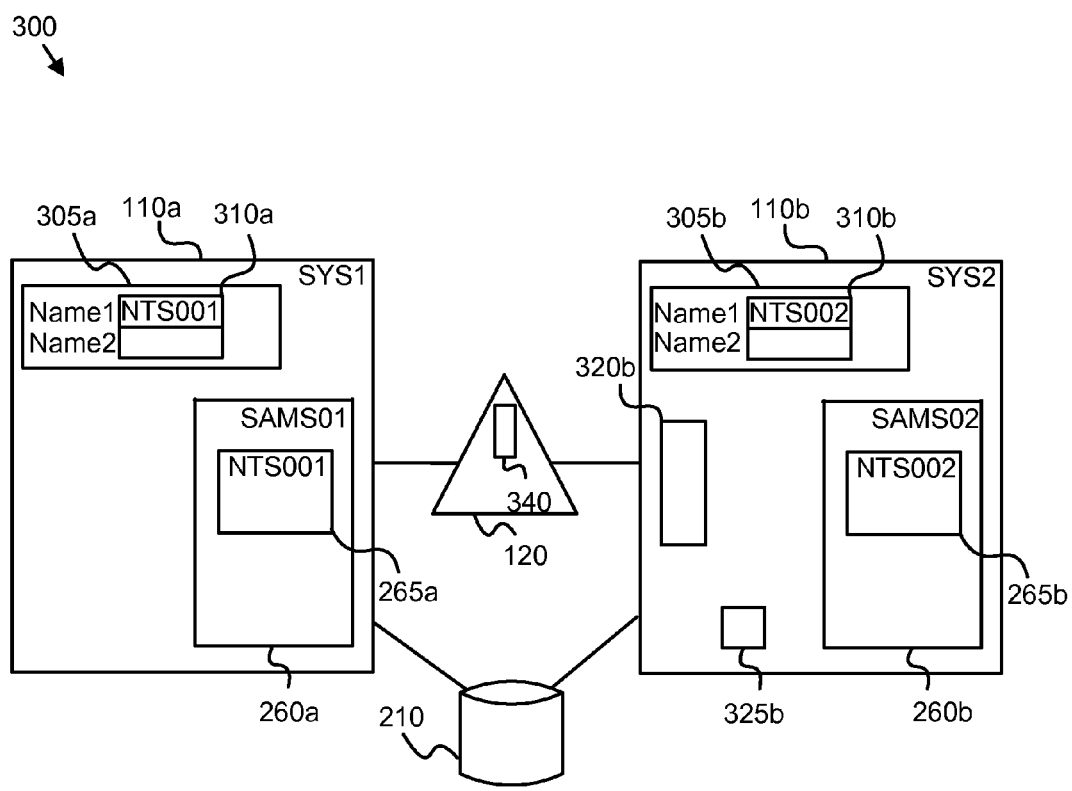
FIG. 3a is a block diagram illustrating one embodiment of a peer recovery system in accordance with the present invention.
Figure 3B:
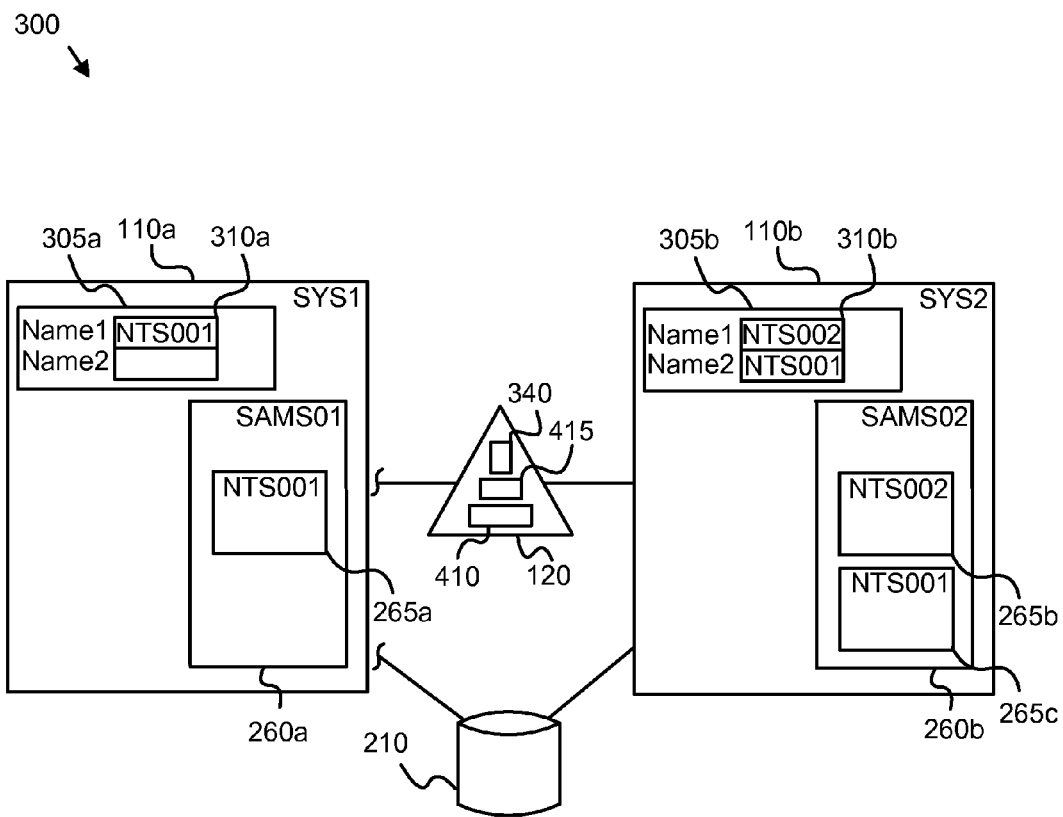
FIG. 3b is a block diagram related to FIG. 3a and illustrating one embodiment of a peer recovery system in accordance with the present invention.

The non-interactive transaction services (NTS) 265 serves as an interface to the batch job handler 250 as an extension from the SAMS 260, extending batch level data sharing to maintain read and write data integrity, and creating an undo log including the before image. The before image preferably contains contents of data records before changes are made in the current transaction, and is used for a transaction backout in the event of a processing failure. Each instance of the NTS 265 in the cluster maintains a private undo log. The undo log is not accessible by peer instances of the NTS 265 in the cluster. An instance of the NTS 265 is the single version of the NTS 265 running on one computer 110. The NTS 265 uses the system logger 255 to store the NTS's 265 undo log in the shared memory controller 120 log structure 240. In one embodiment, in the event of a computer failure of the first computer 110a, the NTS 265b of the second computer 110b may assume the identity of the NTS 265a of the first computer 110a to access the undo log of the first computer 110a for peer recovery, as illustrated in FIGS. 3a and 3b. In that respect, the NTS 265 functions as a recovery module 740 as described in FIG. 5.

FIG. 3a is the first part of a block diagram illustrating a first state of one embodiment of a peer recovery system 300 in accordance with the present invention. The depicted embodiment illustrates a computer cluster including two computers SYS1 110a and SYS2 110b that detect a failure of SYS1 110a by SYS2 110b and a peer recovery by SYS2

Before the computer failure of SYS1 110a, non-interactive transactions take place on both SYS1 110a and SYS2 110b. In SYS1 110a, the NTS module 265a instance named NTS001, after registering with the resource recovery manager (RRS) 305a for transaction commit and backout authorization and registering with the SAMS 260a named SAMS01 260a for operation permission, processes transactions in the address space of SAMS01 260a. The RRS 305a registrant list 310a includes the name of NTS 265a NTS001. In a certain embodiment, the registrant list 310a may include the names of other types of resource managers such as OLTP servers. Likewise, in SYS2 110b, NTS002 processes transactions in the address space of SAMS02 260b.

The RRS 305 is configured to provide sync point management facilities to coordinate and authorize resource recovery activities involving commit and backout requests for application programs and resource managers such as the NTS 265. Each computer 110 periodically updates the computer's 110 own active status and monitors the active status of the other computers 110 in the cluster. The computer status also appropriately applies to the active status of the computer's 110 NTS 265.

When the SYS1 110a fails to update active status within a specified time interval. The shared memory controller 120 marks the failed computer SYS1 110a and the NTS 265a operating under the failed computer SYS1 110a also inactive in a system status table 340 in the shared memory controller 120. An automatic restart manager (ARM) module 320b in SYS2 110b monitors the active statuses of other computers 110 by reading the system status table 340 stored in the shared memory controller 120. The ARM 320b detects SYS1's 110a inactive status condition. The ARM 320b informs NTS002 265b of the SYS1 110a failure and issues a pre-specified operator command to the operator console (not shown) to start peer recovery. Upon the receipt of an activation signal from the operator console, NTS002 265b starts peer recovery. In an alternate embodiment, the ARM 320b informs NTS002 265b of the SYS1 110a failure and starts peer recovery automatically, without operator intervention, given that an auto-restart policy has been previously specified. NTS002 265b determines the name of the NTS 265*a* operating under SYS1 110*a* from the copy of a cluster configuration table 325*b* to be NTS001. NTS002 265*b* attempts to register with the RRS 305*b* as NTS001 265*c* as shown in FIG. 3*b*.

In one embodiment, the RRS 305 checks the status of the failed NTS 265*a* named NTS001 from the system status table 340. If NTS001 265*a* has been marked inactive, the RRS 305 marks NTS001 265*a* active in the system status table 340 and accepts the registration request from NTS002 265*b*. If NTS001 265*a* had been marked active, then RRS 305 would reject the registration request made by NTS002 265*b*. The computer 110 that first sets NTS001 265*a* active from an inactive state in the system status table 340 locks out all other peer computers 100, which may concurrently respond to the detected computer failure until the peer recovery is completed, at which time NTS001 265*a* is marked inactive again in the system status table 340. The failed computer SYS1 110*a* trying to restart NTS001 265*a* must wait until after the peer recovery. In a certain embodiment, each computer 110 is given only a single chance to start a peer recovery for each incident of a computer failure.

In the depicted embodiment, the system status table 340 informs the RRS 305*b* that the NTS 265*a* named NTS001 operating under SYS1 110*a* is inactive and to respond to the request from NTS002 265*b* for registering as NTS001 265*c*. RRS 305*b* then marks NTS001 265*a* active in the system status table 340. Additionally, the RRS 305*b* notifies NTS002 265*b* that the RRS 305*b* accepts the registration requested by NTS002 265*b* intending to operate as NTS001 265*c*. NTS002 265*b* then registers with SAMS02 260*b* to co-operate as NTS001 265*c* in the SAMS02 260*b* address space for peer recovery.

FIG. 3*b* is a block diagram illustrating a second state of the peer recovery system 300 in accordance with the present invention. Some unused elements that are used in FIG. 3*a* are not shown. As depicted, upon the registrations with SAMS02 260*b*, NTS002 265*b* enables a NTS 265*c* as NTS001 to come into being. The NTS 265*c* acting as NTS001 executes within the SMS02 260*b* address space. Following an initialization, the NTS 265*c* acting as NTS001 starts and performs a transactional recovery of the operation unfinished by SYS1 110*a* at the time of failure, while NTS002 265*b* runs its normal transaction processing on SYS2 110*b*. SYS1 110*a* is shown as logically disconnected from the rest of the cluster resources. The NTS 265*c* as NTS001 invokes the RRS 305*b* to indicate that it is beginning restart processing.

The NTS 265*c* acting as NTS001 reads the undo log created originally by the failed NTS 265*a* from the shared memory controller 120 log structure 410. The NTS 265*c* acting as NTS001 processes the undo log data maintained by SYS1. The NTS 265*c* as NTS001 backs out in-flight transaction updates by writing the before image derived from the undo log to files 210 on disk. The NTS 265*c* acting as NTS001 releases data resource locks set by SYS1 by deleting the appropriate lock entries from the lock structure 415 in the shared memory controller 120. The peer recovery actions are now complete. NTS002 265*b* unregisters with the RRS 305*b* as NTS001 265*c*. As a rule, RRS 305 preferably accepts all unregistering requests. Responding to the unregistering request of NTS002 265*b*, RRS 305*b* marks NTS001 265*a* inactive in the system status table 340. Finally, NTS002 265*b* unregisters with SAMS02 260*b* to terminate the assumed NTS001 265*c*.

Figure 3C:
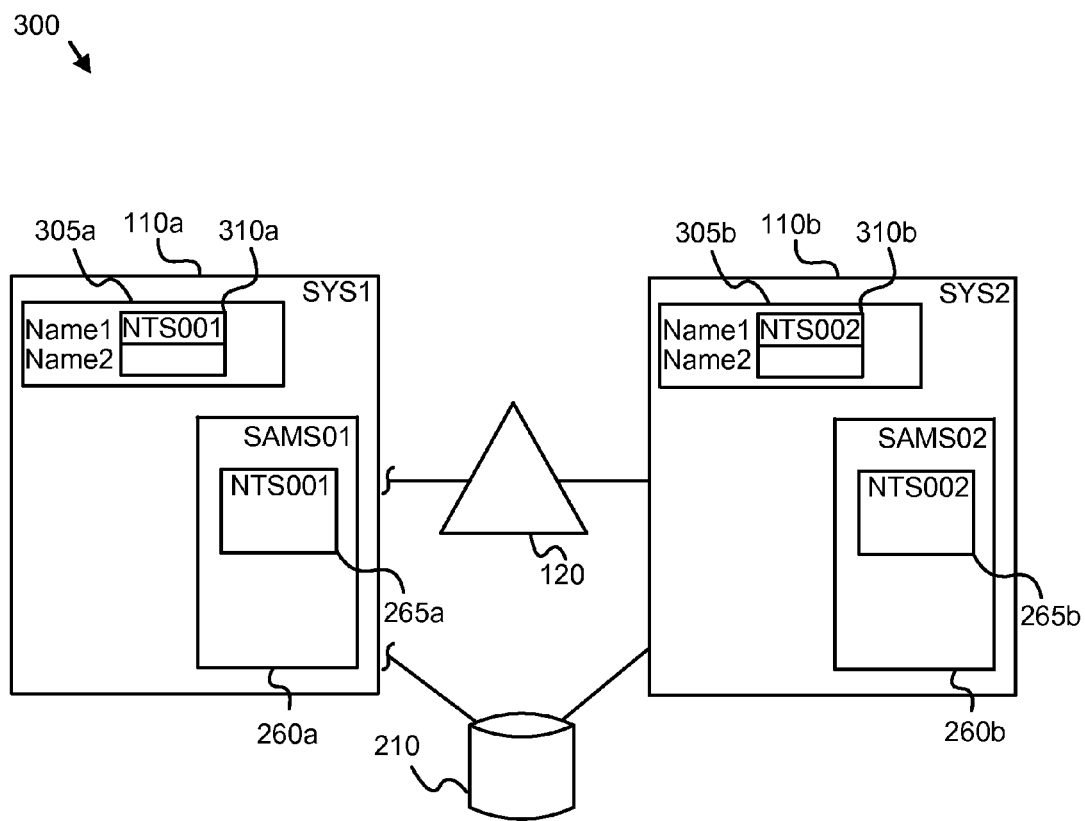
FIG. 3c is a block diagram related to FIG. 3a and illustrating one embodiment of a peer recovery system in accordance with the present invention.

FIG. 3*c* is a block diagram illustrating a third state of the peer recovery system 300 in accordance with the present invention. Some unused elements that are used in FIG. 3*a* or FIG. 3*b* are not shown. As illustrated, NTS001 265*c* is now no longer a registrant with RRS 305*b*, and the address space of SAMS02 260*b* has only one NTS 265 continuously operating, that is, NTS002 265*b*.

Figure 4A:
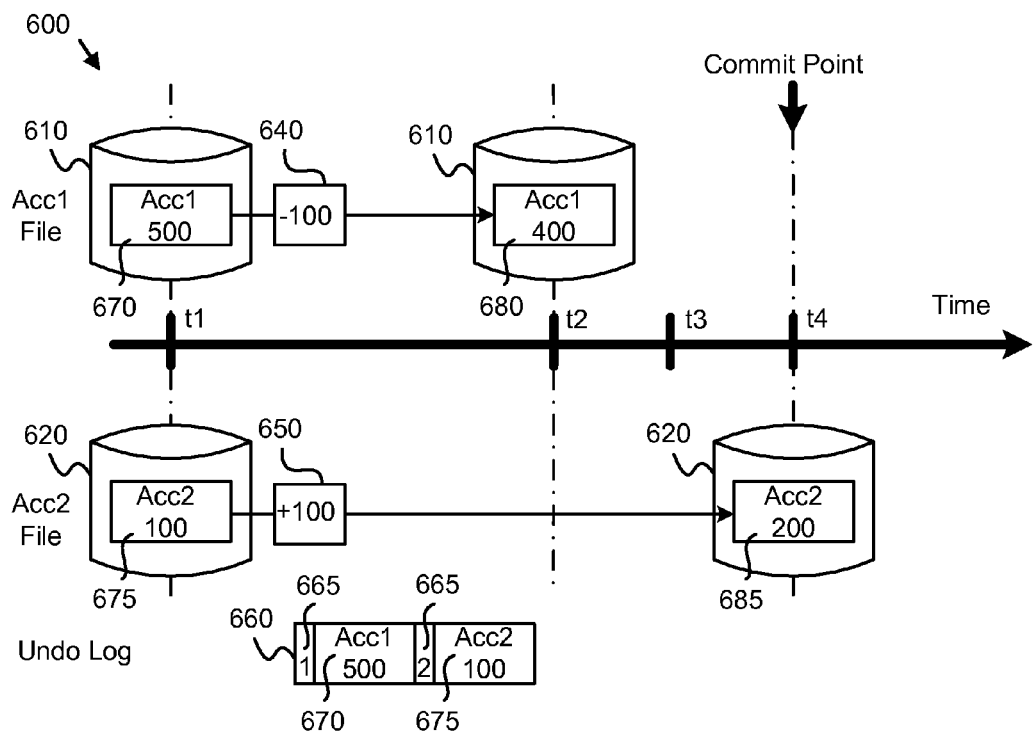
FIGS. 4a and 4b are timing diagrams illustrating one embodiment of atomic updates involved in peer recovery in accordance with the present invention.
Figure 4B:
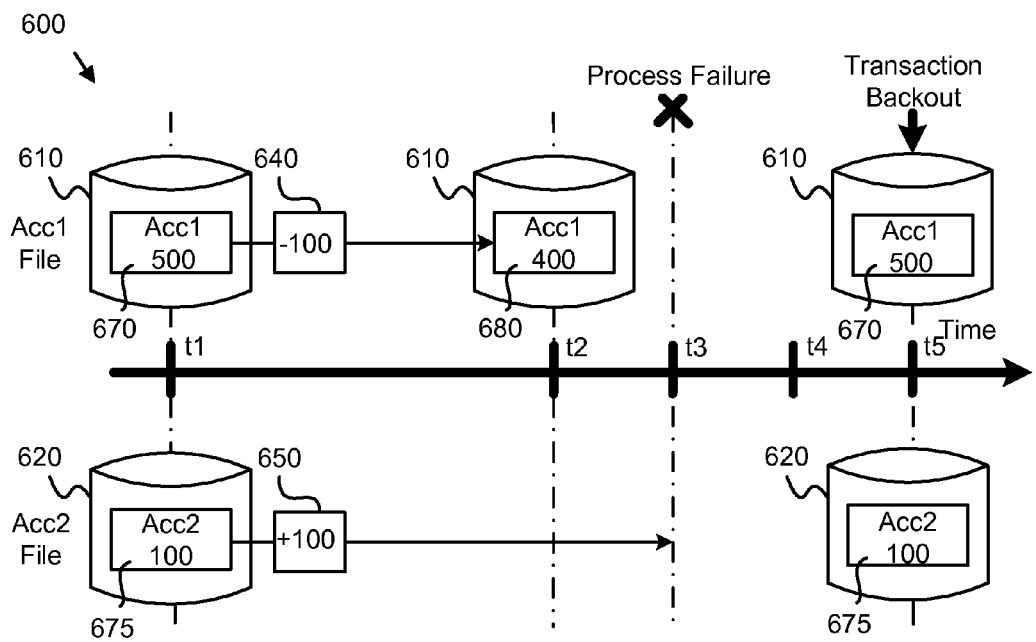

FIGS. 4*a* and 4*b* are timing diagrams illustrating one embodiment of atomic updates 600 involved in peer recovery in accordance with the present invention. Atomic updates 600 are an indivisible group of updates, such that either all updates are made or none are made in order to maintain data integrity. FIG. 4*a* shows a successful and complete transaction occurring between t1 and t4 with no failure in-between. As depicted, with 100 (dollars) transferred from Acc1 to Acc2, both record 670 of Acc1 file 610 and record 675 of Acc2 file 620 are updated to be record 680 and record 685, respectively, at the commit point t4. FIG. 4*b* shows a job failure occurring at t3. The non-interactive transaction services (NTS) 265 provides support to reset transactions back to the level at t1. Referring back to FIG. 4*a*, an undo log 660 was created to contain the before images for the two records 670 and 675, with each record having a header 665 used to identify its location in the owning disk. An undo log such as this is used in performing a transaction backout during the recovery. As a result, both Acc1 file 610 and Acc2 file 620 are restored to their original states at t5, as shown in FIG. 4*b*.

Figure 5:
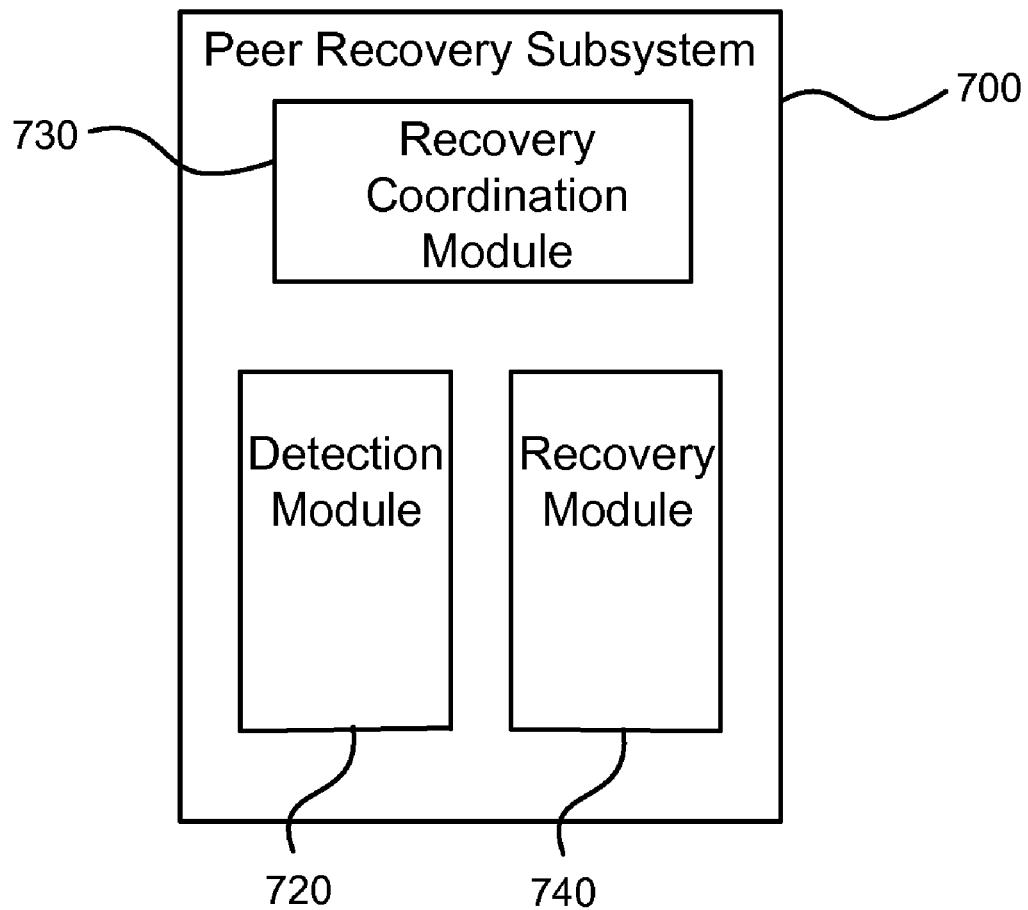
FIG. 5 is a schematic block diagram illustrating one embodiment of a peer recovery device in accordance with the present invention.

FIG. 5 is a schematic block diagram illustrating one embodiment of a peer recovery subsystem 700 in accordance with the present invention. The subsystem 700 is used to perform peer recovery in the event of a computer failure in a cluster of computers 110 processing transactions. The subsystem 700 in the described embodiments includes a detection module 720, a recovery coordination module 730, and a recovery module 740. The detection module 720 detects the failure of a first computer 110*a*. The recovery coordination module 730 accepts and rejects requests from the recovery module 740 for registering as the counterpart of the failed first computer 110*a*, and unregisters the recovery module 740 as the counterpart of the failed first computer 110*a*. The recovery module 740 registers with the recovery coordinator module 730 as the counterpart of the first computer 110*a*, performs recovery operation of the first computer 110*a*, and unregisters with the recovery coordination modules 730 as the counterpart of the first computer 110*a*. The subsystem 700, in one embodiment, is configured to initiate peer recovery automatically. In an alternate embodiment, the subsystem 700 is configured to initiate peer recovery responsive to an operator command. In a further embodiment of the subsystem 700, the recovery module 740 includes an initialization module configured to initialize and start the counterpart of the first computer 110*a* and a backout module configured to retrieve private log data of the first computer 110*a*, back out in-flight transaction updates of the first computer 110*a*, and release data resources locked by the first computer 110*a*.

In a certain embodiment, the subsystem 700 including detection module 720, the recovery coordination module 730, and the recovery module 740 resides within a second computer 110*b*. In one embodiment, the subsystem 700 also resides in the first computer 110*a*. The subsystem 700 is further configured, in one embodiment, to block recovery modules of a third computer (not shown) and the first computer 110*a* from registering as the counterpart of the first computer 110*a*. In a certain embodiment, the detection module 720 further includes a log list module configured to receive a status signal from at least one computer 110, which enables the detection module 720 to identify the failed first computer 110*a* when the log list module does not receive the status signal from the failed first computer 110*a* within a pre-specified time interval. In one embodiment, the NTS 265*b* is a recovery module 740, the automatic restart manager (ARM) 320b is a detection module 720, and the resource recovery services (RRS) 305b is a recovery coordination module 730.

Figure 6:
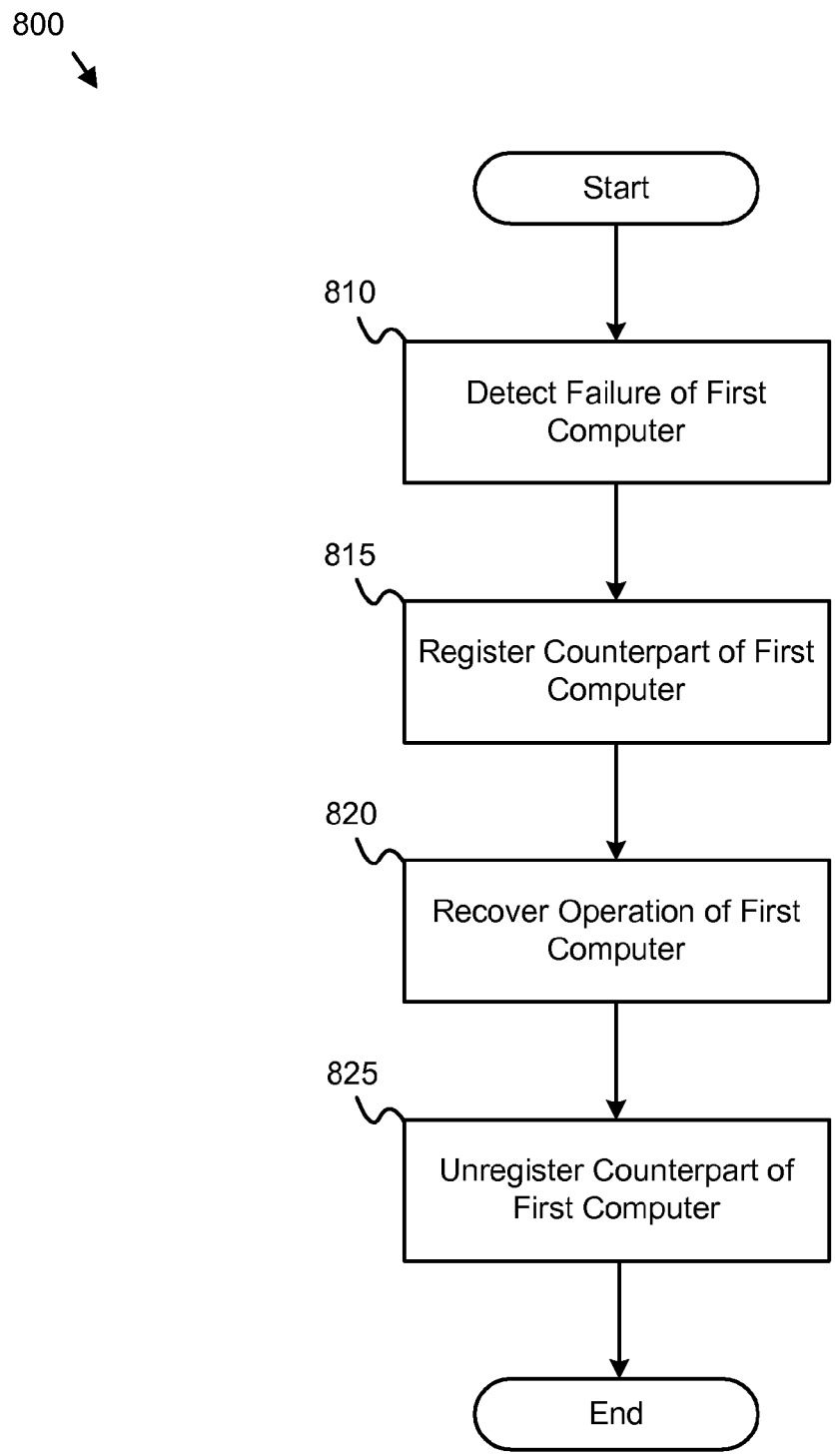
FIG. 6 is a flow chart diagram illustrating one embodiment of a method for peer recovery in accordance with the present invention.

FIG. 6 is a flow chart diagram illustrating one embodiment of a method 800 for peer recovery in accordance with the present invention. The method 800 provides for detection of a failure of a first computer 110a, assumption of failure identity of the failed first computer 110a, and recovery of the operation of the failed first computer 110a. Although for purposes of clarity, the steps of the method 800 and other methods, if any, are depicted in a certain sequential order, execution within an actual system may be conducted in parallel and not necessarily in the depicted order.

The detect failure of first computer step 810 detects a failure of the first computer 110a. The register counterpart of first computer step 815 registers a counterpart of the first computer 110a. In one embodiment, the counterpart is a recovery module 740b. In an alternate embodiment, the counterpart is a second computer 110b. The recover operation of first computer step 820 recovers the failed operation of the first computer 110a by the counterpart. The unregister counterpart of first computer step 825 unregisters the counterpart as counterpart of the first computer 110a. The method 800 for peer recovery recovers the operation of the first computer 110a using the second computer 110b.

Figure 7:
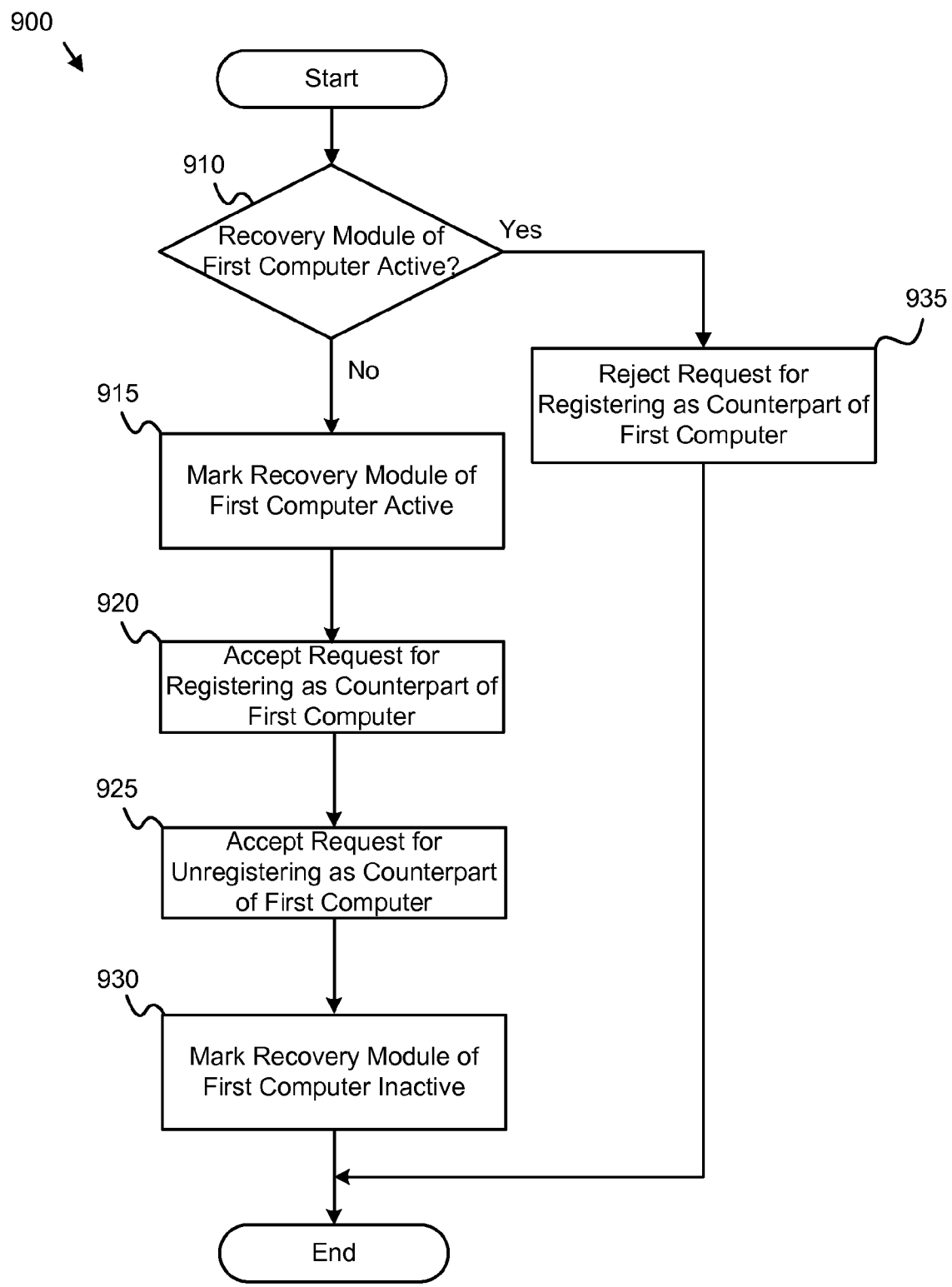
FIG. 7 is a flow chart diagram illustrating an alternate embodiment of a peer recovery method in accordance with the present invention.

FIG. 7 is a flow chart diagram illustrating one alternate embodiment of a peer recovery method 900 in accordance with the present invention. The method 900 provides an authorization by a recovery coordination module 730 of the assumption of the identity of the counterpart of the failed first computer 110a by a recovery module 740b. Once the authorization is granted, recovery modules 740 of a third computer (not shown) and the first computer 110a are blocked from assuming the identity of the first computer 110a. As the failure to update active status by the first computer 110a is first detected by the shared memory controller 120, the shared memory controller 120 marks both the first computer 110a and the recovery module 740a of the first computer 110a inactive in the system status table 340. If the recovery module of first computer active test 910 determines the recovery module 740a is inactive, the mark recovery module of first computer active step 915 marks the recovery module 740a of the first computer 110a active in the system status table 340 by the recovery coordination module 730b for peer recovery.

The accept request for registering as counterpart of first computer step 920 honors the registration of the requester, the recovery module 740b, in the case of the second computer 110b being the first requester, as the counterpart of the first computer 110a. The accept request for unregistering as counterpart of first computer step 925 terminates the registration of the recovery module 740b as the counterpart of the first computer 110a, which represents the end of peer recovery.

The mark recovery module of first computer inactive step 930 resets the active status of the recovery module 740a back to inactive in the system status table 340 after which the first computer 110a may be allowed to attempt a restart. If the recovery module of first computer active test 910 determines the recovery module 740a is active, the reject request for registering as counterpart of first computer step 935 blocks a third computer (not shown) and the first computer 110a from registering as counterparts of the first computer 110a to perform peer recovery which is already in progress.

Figure 8:
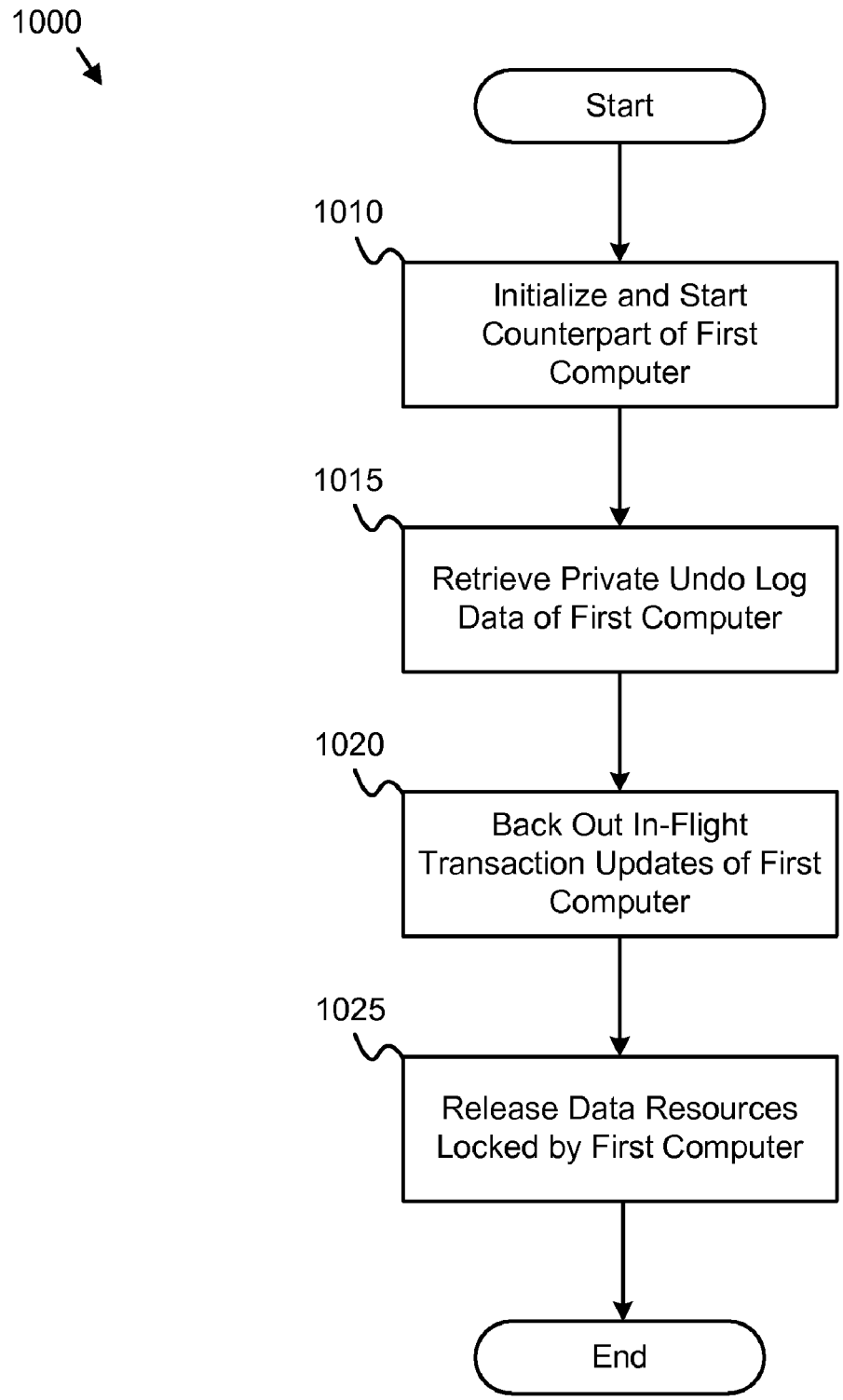
FIG. 8 is a flow chart diagram illustrating one embodiment of a recovery operation in accordance with the present invention.

FIG. 8 is a flow chart diagram illustrating one embodiment of a recovery operation method 1000 in accordance with the present invention. In one embodiment, the recovery operation method 1000 is the recovery operation of first computer step 820 as shown in FIG. 7. Following a successful registration as the counterpart of the failed first computer 110a, the method 1000 provides for the counterpart of the first computer 110a to back out in-flight transactions of the first computer 110a and release data resources locked by the first computer 110a.

The initialize and start counterpart of first computer step 1010 prepares the assumed recovery module 740a for recovery actions using resource of the second computer 110b. The retrieve private undo log data of first computer step 1015 directs the assumed recovery module 740a to retrieve the undo log of the first computer held privately in the shared memory controller 120. The back out in-flight transaction updates of first computer step 1020 backs out in-flight updates made by the first computer 110a by writing the before image derived from the undo log on the affected files on disk. The release data resources locked by first computer step 1025 releases data resources locked by the first computer 110a, so that surviving computers 110 may carry on transaction processing using those resources.

The present invention detects a failure of a first computer 710a and registers a recovery module 740b as the counterpart of the first computer 110a to perform peer recovery. The counterpart retrieves the undo log privately held by the first computer 710a, backs out in-flight transaction updates and releases data resources locked by the first computer 110a. Furthermore, the present invention blocks late coming computers in the cluster from starting duplicated peer recovery. Thus, the present invention expeditiously makes locked data resources available to other processing units by use of resources of the second computer in the cluster.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for cluster-wide peer recovery, the system comprising:

a failed peer computer in a computer cluster;

a plurality of peer computers in the computer cluster, the plurality of peer computers in communication with the failed peer computer, each peer computer comprising, a detection module configured to detect a failure of the failed peer computer; and a recovery module configured to register the corresponding peer computer as a counterpart of the failed peer computer, to block other peer computers from the plurality of peer computers from registering as the counterpart of the failed peer computer, to recover operation of the failed peer computer, and to unregister as the counterpart of the failed first peer computer responsive to detecting the failure of the failed peer computer, wherein the recovery module recovers the operation of the failed peer computer by initializing and starting the counterpart peer computer as the counterpart of the failed peer computer, retrieving private log data of the failed peer computer, backing out an in-flight transaction update of the failed peer computer by writing a before image derived from an undo log to files on a disk, and releasing a data resource locked by the failed peer computer;

a recovery coordination module configured to accept and reject requests from the recovery module for registering as the counterpart of the failed peer computer, and unregistering the recovery module as the counterpart of the failed peer computer, a shared memory controller in communication with the failed peer computer and the plurality of peer computers, the shared memory controller configured to store and retrieve computer component status and log data, the shared memory controller further configured to prevent unauthorized access to private log data and to lock data resources; and a disk configured to store and retrieve user data and system data in the disk's storage media for the computer cluster.

2. The system of claim 1, the recovery module further configured to initiate peer recovery automatically.

3. The system of claim 1, the recovery module further configured to initiate peer recovery responsive to an operator command.

4. The system of claim 1, wherein the shared memory controller comprises a dedicated processor and a memory module.

5. The system of claim 4, wherein the memory module is nonvolatile memory.

6. The system of claim 1, wherein the failed peer computer and the counterpart peer computer communicate point-to-point, using a channel-to-channel communication connection comprising an inbound signaling path and an outbound signaling path.

7. The system of claim 1, wherein the computers use a symmetric multiprocessor configuration.

8. The system of claim 1, wherein the computers use an asymmetric multiprocessor configuration.

9. A non-transitory computer readable storage medium comprising computer readable code configured to carry out a method for peer recovery, the method comprising:

detecting a failure of a failed peer computer by a peer computer from a plurality of peer computers, the failed peer computer and the plurality of peer computers part of a computer cluster;

registering, by the peer computer the plurality of peer computers, the peer computer as a counterpart of the failed peer computer to block other peer computers from the plurality of peer computers from registering as the counterpart of the first peer computer;

recovering the operation of the failed peer computer by the counterpart peer computer by initializing and starting the counterpart peer computer as the counterpart of the failed peer computer, retrieving the private log data of the failed peer computer, backing out an in-flight transaction update of the failed peer computer by writing a before image derived from an undo log to files on a disk, and releasing a data resource locked by the failed peer computer; and unregistering, by the counterpart peer computer, the counterpart peer computer as the counterpart of the failed peer computer.

10. The computer readable storage medium of claim 9, the method further comprising computer readable code configured to initiate the peer recovery automatically.

11. The computer readable storage medium of claim 9, the method further comprising computer readable code configured to initiate the peer recovery responsive to an operator command.

12. A method for peer recovery, the method comprising:

detecting a failure in a failed peer computer by a peer computer from a plurality of peer computers, the failed peer computer and the plurality of peer computers part of a computer cluster;

registering, by the peer computer the plurality of peer computers, the peer computer as a counterpart of the failed peer computer to block other peer computers from the plurality of peer computers from registering as the counterpart of the first peer computer;

recovering the operation of the failed peer computer by the counterpart peer computer by initializing and starting the counterpart peer computer as the counterpart of the failed peer computer, retrieving the private log data of the failed peer computer, backing out an in-flight transaction update of the failed peer computer by writing a before image derived from an undo log to files on a disk, and releasing a data resource locked by the failed peer computer; and unregistering, by the counterpart peer computer, counterpart peer computer as the counterpart of the failed peer computer.

13. The method of claim 12, further comprising initiating peer recovery automatically.

14. The method of claim 12, further comprising initiating peer recovery responsive to an operator command.

15. An apparatus for peer recovery, the apparatus comprising:

means for detecting a failure of a failed peer computer by a peer computer from a plurality of peer computers, the failed peer computer and the plurality of peer computers part of a computer cluster comprising;

means for registering, by the peer computer from the plurality of peer computers, the peer computer as a counterpart of the failed peer computer;

means for blocking other peer computers from the plurality of peer computers from registering as the counterpart of the failed peer computer in response to the counterpart peer computer registering as the counterpart of the failed peer computer;

means for recovering the operation of the failed peer computer by the counterpart peer computer by initializing and starting the counterpart peer computer as the counterpart of the failed peer computer, retrieving the private log data of the failed peer computer, backing out an in-flight transaction update of the failed peer computer by writing a before image derived from an undo log to files on a disk, and releasing a data resource locked by the failed peer computer; and means for unregistering, by the counterpart peer computer, the counterpart peer computer as the counterpart of the failed peer computer.

* * * * *